US012085885B2

(12) United States Patent
Yu et al.

(10) Patent No.: US 12,085,885 B2
(45) Date of Patent: Sep. 10, 2024

(54) CONNECTION STRUCTURE FOR COUPLING WITH TONER CARTRIDGE

(71) Applicant: Hewlett-Packard Development Company, L.P., Spring, TX (US)

(72) Inventors: Jaeil Yu, Seongnam-si (KR); Changwoo Lee, Seongnam-si (KR); Junhui Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/025,759

(22) PCT Filed: Jun. 23, 2021

(86) PCT No.: PCT/US2021/038621

§ 371 (c)(1),
(2) Date: Mar. 10, 2023

(87) PCT Pub. No.: WO2022/055591

PCT Pub. Date: Mar. 17, 2022

(65) Prior Publication Data

US 2023/0350337 A1 Nov. 2, 2023

(30) Foreign Application Priority Data

Sep. 10, 2020 (KR) ........................ 10-2020-0115834

(51) Int. Cl.

| | |
|---|---|
| ***G03G 21/00*** | (2006.01) |
| ***G03G 15/08*** | (2006.01) |
| ***G03G 21/16*** | (2006.01) |
| ***G03G 21/18*** | (2006.01) |

(52) U.S. Cl.
CPC ..... *G03G 21/1647* (2013.01); *G03G 15/0865* (2013.01); *G03G 21/1857* (2013.01); *G03G 2221/1657* (2013.01)

(58) Field of Classification Search
CPC ........... G03G 15/5008; G03G 21/1647; G03G 21/1857; G03G 21/186; G03G 2221/1657
USPC .................................. 399/111, 119, 167, 263
See application file for complete search history.

(56) References Cited

U.S. PATENT DOCUMENTS

| | | | |
|---|---|---|---|
| 5,926,666 | A | 7/1999 | Miura et al. |
| 6,301,457 | B1 | 10/2001 | Chadani et al. |
| 10,289,062 | B2 | 5/2019 | Kim et al. |
| 10,539,924 | B2 | 1/2020 | Ueno et al. |
| 10,678,184 | B2 | 6/2020 | Murakami et al. |
| 2007/0071496 | A1 | 3/2007 | Lee |

(Continued)

FOREIGN PATENT DOCUMENTS

| | | | |
|---|---|---|---|
| JP | 2017-107205 | A | 6/2017 |
| KR | 10-2007-0087738 | A | 8/2007 |
| KR | 10-2014-0095405 | A | 8/2014 |

*Primary Examiner* — Robert B Beatty
(74) *Attorney, Agent, or Firm* — Foley & Lardner LLP

(57) ABSTRACT

An example connection structure to couple with a toner cartridge includes a connector to be located at a driving position to contact a coupler provided in a toner cartridge, or a tilting position to be tilt with respect to the driving position, and a position maintaining portion to maintain the connector at the tilting position when the connector is separate from the coupler. The connector located at the tilting position is tilted toward a direction opposite to a direction in which the coupler moves when making contact with the connector.

16 Claims, 10 Drawing Sheets

A

(56) References Cited

U.S. PATENT DOCUMENTS

| | | | | |
|---|---|---|---|---|
| 2008/0240796 | A1* | 10/2008 | Morioka | G03G 15/081 399/279 |
| 2009/0196655 | A1* | 8/2009 | Takigawa | G03G 21/1864 399/167 |
| 2010/0054778 | A1* | 3/2010 | Adachi | G03G 15/0818 399/53 |
| 2010/0054823 | A1* | 3/2010 | Takasaka | F16D 1/10 399/286 |
| 2015/0220051 | A1 | 8/2015 | Morioka et al. | |
| 2016/0154376 | A1* | 6/2016 | Xiao | F16D 3/265 399/111 |
| 2018/0284686 | A1 | 10/2018 | Matsuoka et al. | |
| 2020/0073325 | A1 | 3/2020 | Zeng et al. | |
| 2020/0225614 | A1* | 7/2020 | Chino | G03G 21/1647 |
| 2023/0375973 | A1* | 11/2023 | Lee | G03G 21/186 |

* cited by examiner

CONNECTION STRUCTURE FOR COUPLING WITH TONER CARTRIDGE

CROSS-REFERENCE TO RELATED APPLICATIONS

This application is a U.S. National Stage Patent Application under 35 U.S.C. § 371 of PCT/US2021/038621, filed Jun. 23, 2021, which claims priority to Korean Patent Application No. 10-2020-0115834, filed Sep. 10, 2020, which are hereby incorporated by reference in their entireties.

BACKGROUND

An image forming apparatus may refer to a device to generate, print, receive, and transmit image data. For example, the image forming apparatus may include a printer, a scanner, a copier, a fax machine, and a multi-function printer implemented by integrating a plurality of functions of such devices.

In an example, an image forming apparatus may output data to a printing medium using a toner cartridge. Such a toner cartridge may be installed on a toner cartridge support, and may be replaced with a new toner cartridge after being used for a period of time.

DETAILED DESCRIPTION

Hereinafter, examples will be described with reference to the accompanying drawings.

A component that is described as "connected," "supported," or "contacted" to another component may be directly connected, supported, or contacted to the other component or a third component may be interposed between the two components.

Terms used in the description are to describe examples without limiting the disclosure. An expression used in the singular encompasses the expression of the plural, unless it has a clearly different meaning in the context.

Various terms used herein, including ordinal numbers such as "first" and "second," may be used to describe, and not to limit, various components. The terms are used for distinguishing the components from one another.

The term "including" as used in the description refers to a characteristic, region, integer, step, action, element, and/or component, and is not to limit the existence or addition of another characteristic, region, integer, step, action, element, component, and/or group.

Hereinafter, an example image forming apparatus will be described with reference to the drawings.

In an example, an image forming apparatus may generate, print, receive, or transmit image data. For example, the image forming apparatus may be a printer, a copier, a scanner, a fax machine, or a multi-function peripheral printer (MIFF) that complexly implements functions of the printer, the copier, the scanner, and the fax machine through one apparatus. For sake of convenience and not by way of limitation, an image forming apparatus hereinafter described may be referred to as a printer.

Figure 1:
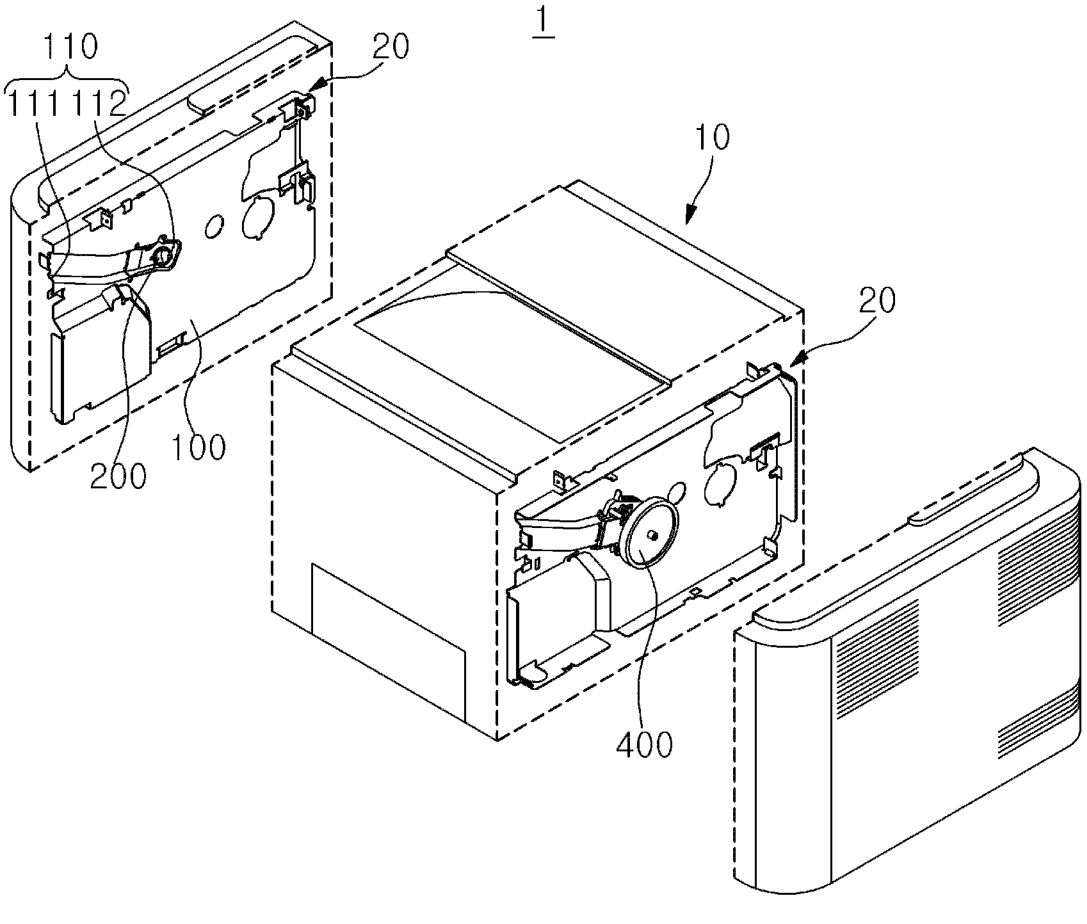
FIG. 1 is a perspective view of an image forming apparatus according to an example.
Figure 2:
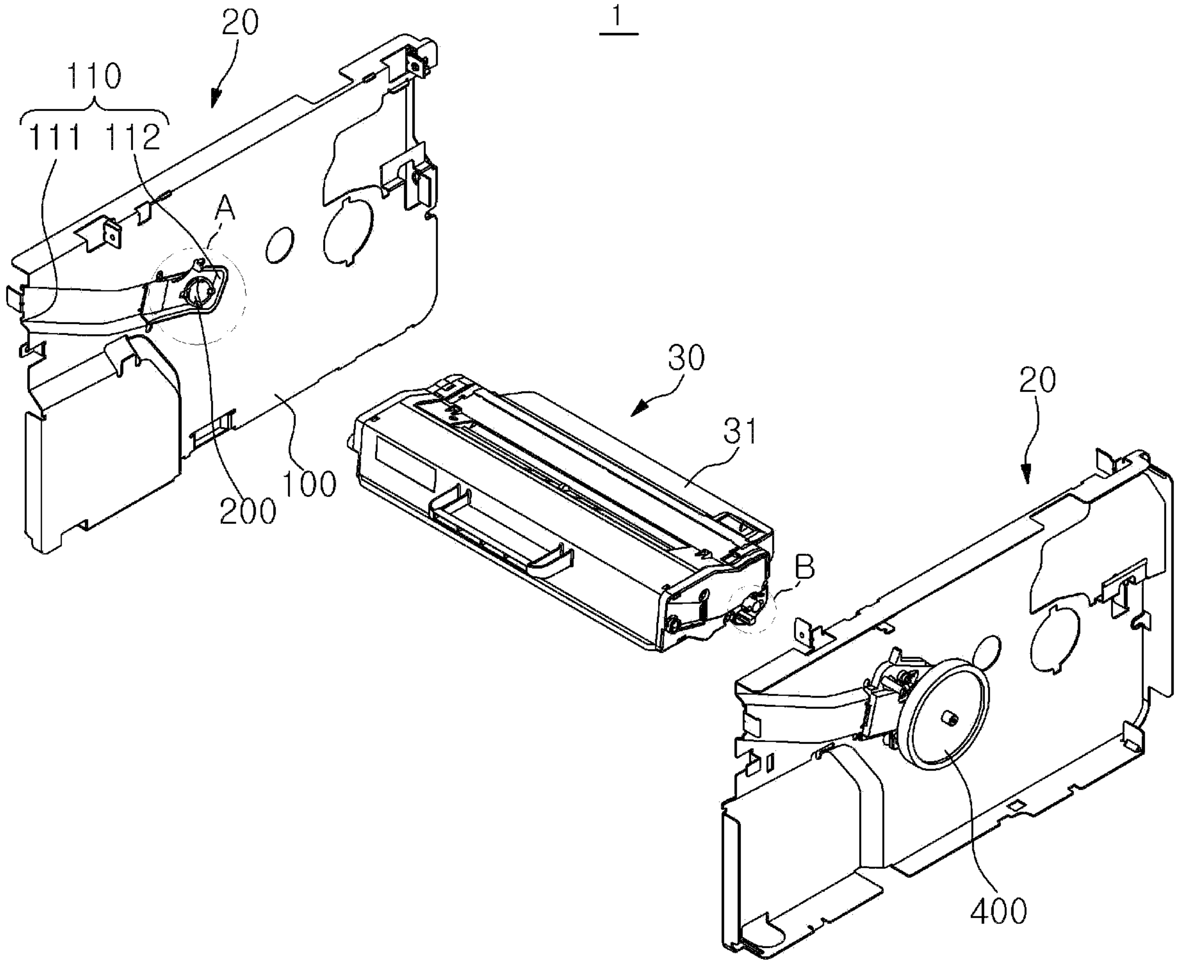
FIG. 2 is a partially exploded perspective view of the image forming apparatus shown in FIG. 1 according to an example.
Figure 3:
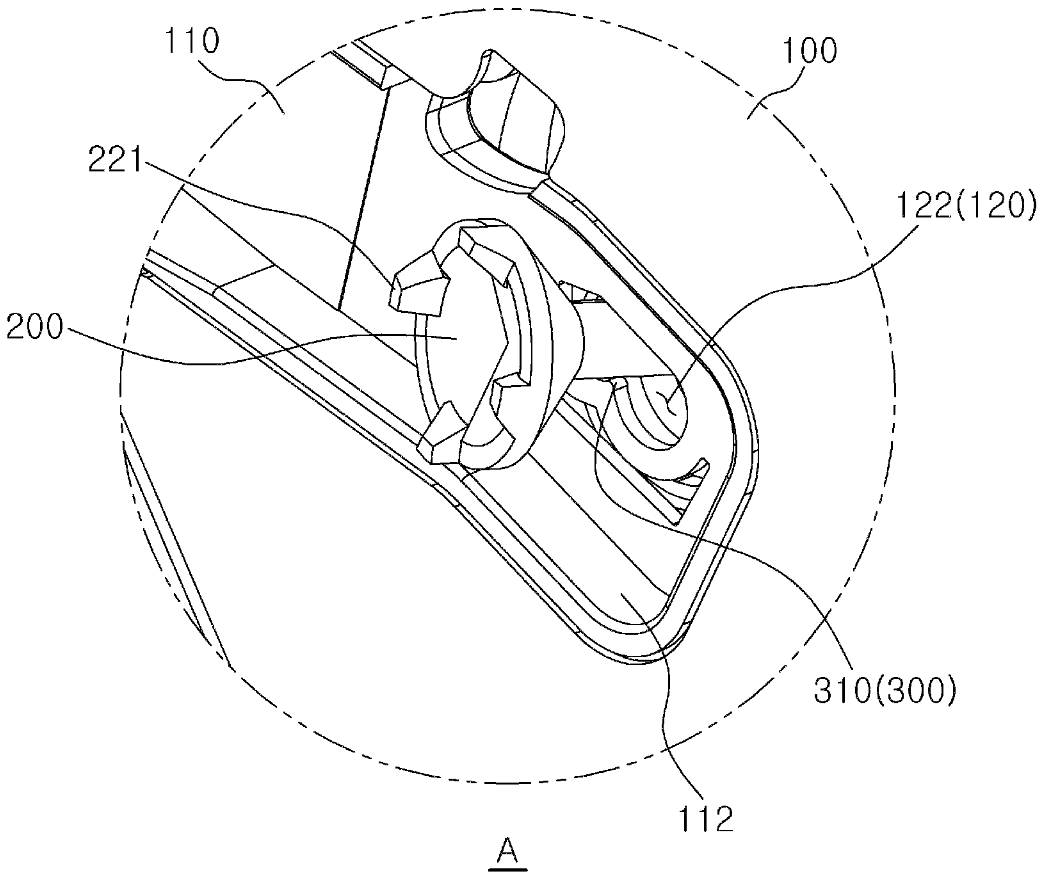
FIG. 3 is an enlarged view of part A shown in FIG. 2 according to an example.
Figure 4:
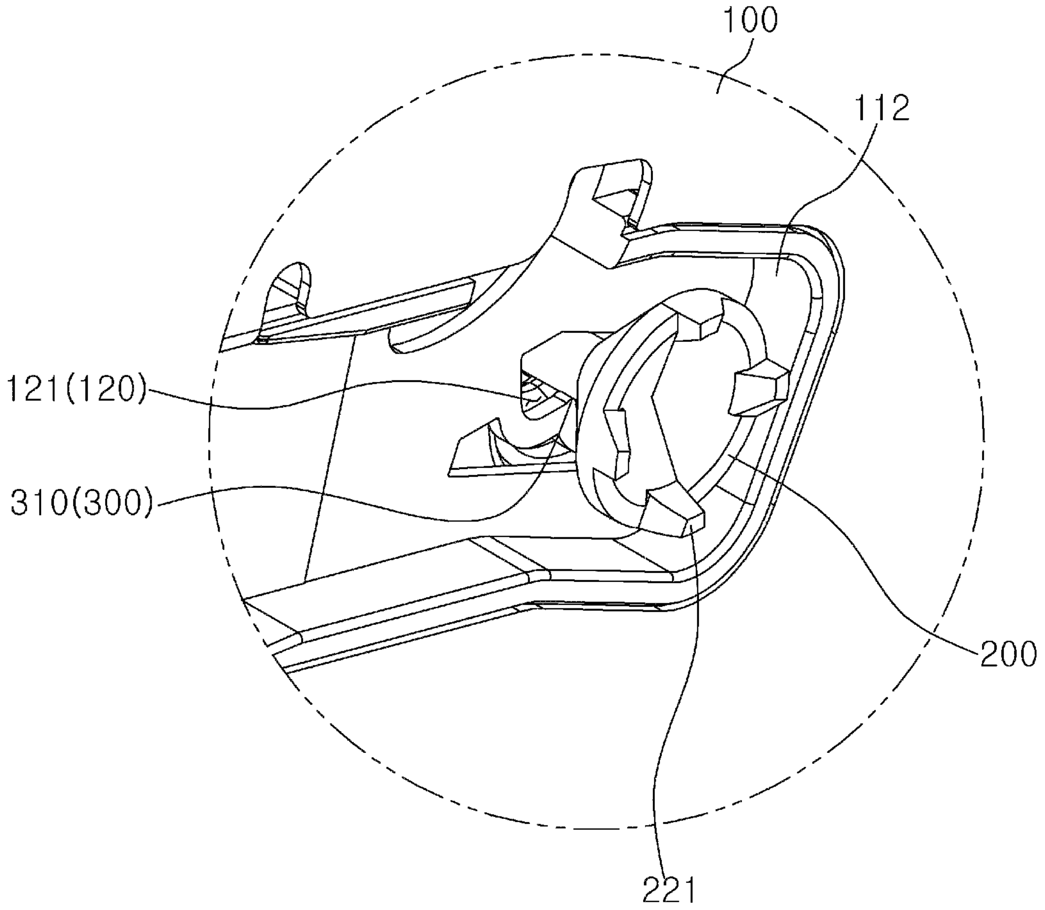
FIG. 4 is an enlarged view of part A in which the connector shown in FIG. 2 is located at a driving position according to an example.

FIG. 1 is a perspective view of an image forming apparatus according to an example. FIG. 2 is a partially exploded perspective view of the image forming apparatus shown in FIG. 1 according to an example. FIG. 3 is an enlarged view of part A shown in FIG. 2 according to an example. FIG. 4 is an enlarged view of part A in which the connector shown in FIG. 2 is located at a driving position according to an example.

Referring to FIGS. 1 through 4, an image forming apparatus 1 may print data generated by a terminal device such as a computer or the like on a printing medium such as paper or the like. The image forming apparatus 1 may include a main body 10, a toner cartridge support 20, and a toner cartridge 30.

The main body 10 may include a space to accommodate the toner cartridge support 20 and the toner cartridge 30. The main body 10 may include a space in which hard copying is performed. As used herein, the term "hard copying" may refer to an operation in which an image is output to a printing medium such as paper or the like. The main body 10 may include a door to open and close an internal space of the main body 10 to the outside. The toner cartridge 30 may be brought into or taken out of the main body 10 through the door.

The toner cartridge support 20 may include a toner cartridge connection structure for the toner cartridge 30. The toner cartridge support 20 may be separable from the toner cartridge 30. In an example in which the toner cartridge 30 is to be replaced, the toner cartridge support 20 and the toner cartridge 30 may be separated. In addition, the toner cartridge support 20 may be connected to the toner cartridge 30, and may transmit power of a driving part (not shown) to the toner cartridge 30. The toner cartridge support 20 may include a frame 100, a connector 200, a position maintaining portion 300, and a driving wheel 400.

The frame 100 may support the toner cartridge 30. The frame 100 may support the connector 200 and the position maintaining portion 300. The frame 100 may be supported by the main body 10. The frame 100 may guide a movement of the toner cartridge 30 to be connected to the toner cartridge support 20. The frame 100 may support the toner cartridge 30 at both sides of the toner cartridge 30. A guide 110 and a through-hole 120 may be located on the frame 100.

The guide 110 may guide a movement of the toner cartridge 30. For example, the guide 110 may guide a movement of the toner cartridge 30 so that the toner cartridge 30 moves along the guide 110 to be connected to the toner cartridge support 20. In an example, the guide 110 may include a plurality of protrusions protruding from the frame 100 or may include a groove concavely located on the frame 100. The guide 110 may include a guide inlet 111 and a coupling portion 112.

The guide inlet 111 may include a portion through which the toner cartridge 30 is to enter and exit the guide 110. The guide inlet 111 may be located toward the door side of the main body 10 in the guide 110.

The coupling portion 112 may include a portion at which the connector 200, to engage with a coupler, may be located. The coupling portion 112 may be located at an opposite side of the guide 110 from a location of the guide inlet 111.

The through-hole 120 may include a space in which the connector 200 may move. The connector 200 may move between a tilting position and a driving position, which are to be described later, through the through-hole 120. For example, the through-hole 120 may penetrate the frame 100. In an example, the through-hole 120 may include a first region 121 through which the connector 200 located at the tilting position is to pass, and a second region 122 through which the connector 200 located at the driving position is to pass.

The connector 200 may be connected to a coupler (e.g., a coupler 32 of FIG. 5, to be described later) and may transmit power to the coupler. The connector 200 may be moved between the tilting position and the driving position. As used herein, the terms "tilting position" and "driving position" may refer to the position of the connector 200 as well as an orientation and a posture of the connector 200.

The term "tilting position" refers to a position of the connector 200 at which the connector 200 is tilted at an angle with respect to the driving position. As used herein, the term "tilting position" may refer to the position of the connector 200 as well as an orientation and posture of the connector 200. For example, as illustrated in FIG. 3, at the tilting position, the connector 200 may be tilted in a direction opposite to (e.g., facing) a direction in which the coupler is to move immediately before making contact with the connector 200. In an example, the connector 200 located at the tilting position may be tilted toward a direction opposite to a direction in which the coupler is to move when making contact with the connector 200. The connector 200 located at such a tilting position may be tilted in a direction extending from the coupling portion 112 toward the guide inlet 111. The connector 200 located at such a tilting position may make contact with a maintaining protrusion 310 to be described later, and arbitrary movement of the connector 200 to the driving position may be avoided or prevented by the maintaining protrusion 310. Accordingly, the connector 200 may be located and maintained at the tilting position.

The term "driving position" refers to a position of the connector 200 at which the connector 200 is to support the coupler when the toner cartridge 30 is located at an operable position. For example, as illustrated in FIG. 4, the driving position refers to the position of the connector 200 at which the connector 200 may be connected to the coupler in order to transmit power to the coupler and at which the connector 200 may be located in a straight line with the coupler. The connector 200 located at such a driving position may be provided so as to avoid contact with the maintaining protrusion 310 or the frame 100. Thus, the connector 200 may freely rotate without interference with the maintaining protrusion 310 or the frame 100. In addition, the connector 200 may move between the tilting position and the driving position by moving along a movement path between the tilting position and the driving position. In this regard, the movement path of the connector 200 may include a region in which the connector 200 moves between the tilting position and the driving position.

Figure 5:
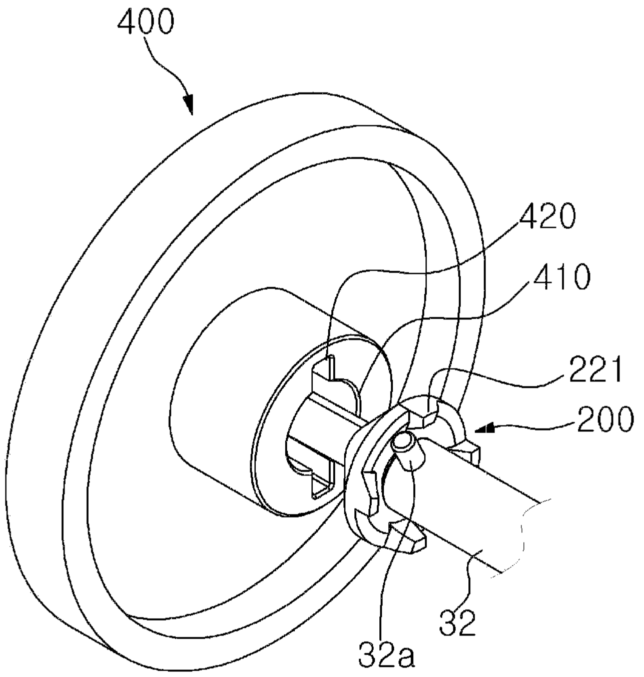
FIG. 5 is a perspective view showing a state in which the driving wheel, the connector, and the coupler, shown in FIG. 2, are connected according to an example.
Figure 6:
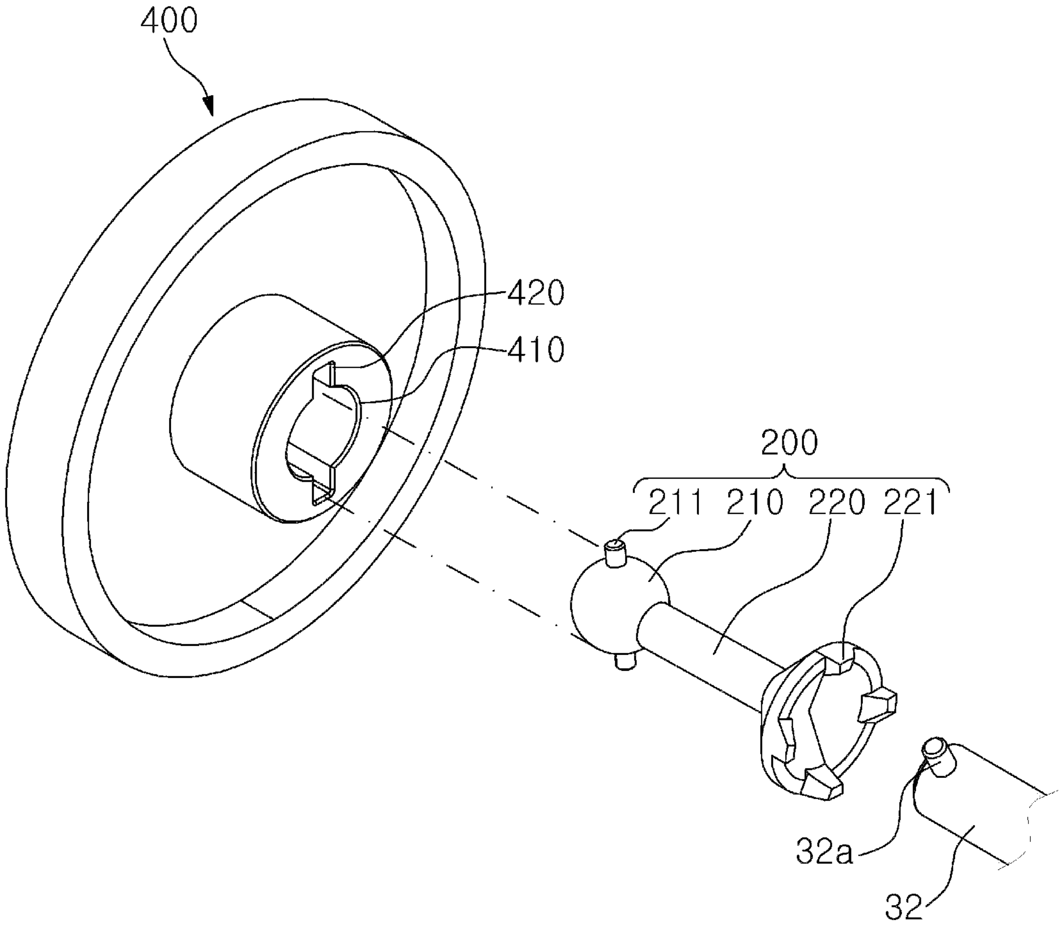
FIG. 6 is an exploded perspective view of components shown in FIG. 5 according to an example.

FIG. 5 is a perspective view showing a state in which the driving wheel, the connector, and the coupler, shown in FIG. 2, are connected according to an example. FIG. 6 is an exploded perspective view of components shown in FIG. 5 according to an example.

Referring to FIGS. 5 and 6, the connector 200 may include a rotatable portion 210 and a support portion 220. The rotatable portion 210 may be inserted into an insertion portion 410 of the driving wheel 400, and may be rotatable inside the insertion portion 410. The rotatable portion 210 may support the support portion 220 and may rotate in response to a movement of the support portion 220. For example, the rotatable portion 210 may have a spherical shape. A locking protrusion 211 may be located on the rotatable portion 210.

The locking protrusion 211 may be engaged with an engaging groove 420 of the driving wheel 400 to be described later. For example, the locking protrusion 211 may protrude from an outer circumferential surface of the rotatable portion 210 in a direction perpendicular to a direction in which a rotation axis of the driving wheel 400 extends (see FIG. 6). The connector 200 may rotate together with the driving wheel 400 by allowing the locking protrusion 211 to engage with the engaging groove 420. In an example, the locking protrusion 211 may be spaced apart from an inner wall of the engaging groove 420. By allowing the locking protrusion 211 to engage with the engaging groove 420 and allowing the locking protrusion 211 to be spaced apart from the inner wall of the engaging groove 420 in this way, the locking protrusion 211 can freely rotate. In addition, the connector 200 may be engaged with the driving wheel 400 through the locking protrusion 211 so as to be tilted to a tilting position regardless of the rotational phase of the driving wheel 400. For example, regardless of the angle at which an arbitrary point of the driving wheel 400 is rotated with respect to an arbitrary reference axis extending on a virtual plane perpendicular to the rotation axis of the driving wheel 400, the connector 200 may be tilted to the tilting position with respect to the driving wheel 400.

The support portion 220 may move in response to the movement of the coupler 32 and may rotate around the rotatable portion 210. For example, the support portion 220 may be located at the tilting position before making contact with the coupler 32. Furthermore, when the toner cartridge 30 is installed on the toner cartridge support 20, the support portion 220 may be moved to the driving position in response to the movement of the coupler 32. In an example, one side of the support portion 220 may have a groove shape having an inclination so that the end of the coupler 32 can be inserted into a groove of the support portion 220. In an example, the coupler 32 may approach the support portion 220 such that the coupler 32 moves while being inserted into the groove of the support portion 220, so that the support portion 220 moves from the tilting position to the driving position. In addition, the support portion 220 located at the tilting position may be tilted at an angle so that the coupler 32 may be inserted into the groove. A stopper 221 may be located on the support portion 220.

The stopper 221 may prevent the coupler 32 from being separated from the support portion 220. For example, a plurality of stopper 221 may be provided and the stoppers 221 may each protrude from one end of the support portion 220. A locking protrusion 32_a_ of the coupler 32 to be described later may be engaged between some of the stoppers 221. Based on this engagement, even if the support portion 220 rotates, the coupler 32 may rotate in response to the rotation of the support portion 220 without being separated from the support portion 220.

In an example, the connector 200 located at the tilting position may be maintained at a position and angle by the position maintaining portion 300. As an example, if the connector 200 moves between the driving position and the tilting position, a position and an inclination angle of the connector 200 located at the tilting position may be maintained. Accordingly, even if the toner cartridge 30 is replaced a plurality of times, the coupler 32 can be connected to the connector 200, and the locking protrusion 32*a* can be positioned between the stoppers 221.

In an example, as the connector 200 is separate from the coupler 32 (i.e., the connector 200 does not make contact with the coupler 32), the position maintaining portion 300 may maintain the connector 200 at the tilting position. The position maintaining portion 300 may be supported by the frame 100 and may include the maintaining protrusion 310 protruding into the through-hole 120. The maintaining protrusion 310 may be located on a movement path of the connector 200 between the tilting position and the driving position, so that arbitrary movement of the connector 200 between the tilting position and the driving position can be avoided or prevented. The maintaining protrusion 310 may protrude into the through-hole 120 between the first region 121 and the second region 122, In addition, the position maintaining portion 300 may include an elastic material. Accordingly, as the connector 200 moves between the tilting position and the driving position, the maintaining protrusion 310 may be pressed and deformed by the connector 200.

Referring again to FIGS. 5 and 6, the driving wheel 400 may transmit power, transmitted from the driving part, to the connector 200. As an example, the driving part for rotating the driving wheel 400 may be a motor or an actuator. One side of the driving wheel 400 may be connected to the driving part, and the other side thereof may be engaged with the connector 200, In addition, the insertion portion 410 and the engaging groove 420 may be located in the driving wheel 400. The driving wheel 400 may be located coaxially with the connector 200 and the coupler 32 as the connector 200 is located at the driving position.

The rotatable portion 210 may be inserted into the insertion portion 410. The insertion portion 410 may include a space in which the rotatable portion 210 is to rotate. The insertion portion 410 may be recessed inward of the driving wheel 400.

The locking protrusion 211 may be inserted into the engaging groove 420, The engaging groove 420 may include a space in which the locking protrusion 211 is to rotate. For example, the driving wheel 400 may rotate while the locking protrusion 211 is engaged with the engaging groove 420, so that the driving wheel 400 may rotate together with the connector 200. The engaging groove 420 may be located closer to the circumferential surface of the driving wheel 400 than the insertion portion 410. In an example, a separation space may be located between the inner wall of the engaging groove 420 and the end of the locking protrusion 211. For this reason, the locking protrusion 211 can move in the internal space of the engaging groove 420 without being caught in the engaging groove 420.

Figure 7:
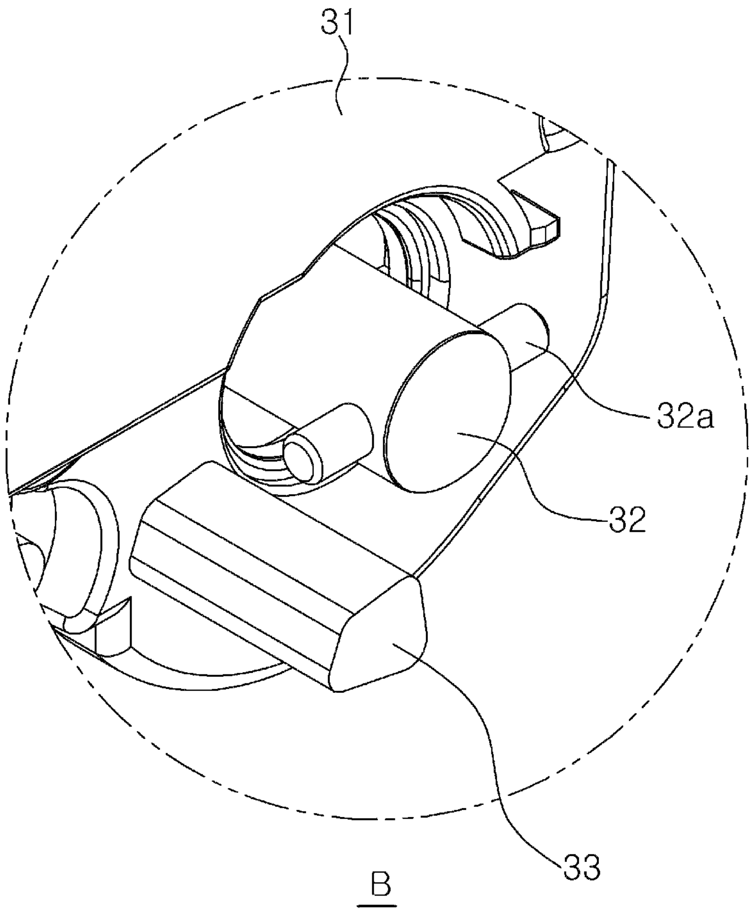
FIG. 7 is an enlarged view of part B shown in FIG. 2 according to an example.

FIG. 7 is an enlarged view of part B shown in FIG. 2 according to an example.

Referring to FIGS. 2 and 7, the toner cartridge 30 may contain toner used to output an image. The toner cartridge 30 may be installed on the toner cartridge support 20. For example, the toner cartridge 30 may be replaced with a new toner cartridge 30 after being used for a period of time, and may be installed on the toner cartridge support 20. The toner cartridge 30 may include a cartridge body 31, the coupler 32, and a pressing release portion 33.

The cartridge body 31 may contain toner. In addition, the cartridge body 31 may be installed on the toner cartridge support 20, and may support the coupler 32 and the pressing release portion 33.

The coupler 32 may make contact with the connector 200 and may move the connector 200 between the tilting position and the driving position by moving together with the cartridge body 31. For example, one end of the coupler 32 may contact the groove of the support portion 220. The coupler 32 may protrude from the cartridge body 31, and may be located on a lateral side of the cartridge body 31. In addition, the locking protrusion 32*a* may be located on an outer circumferential surface of the coupler 32.

The locking protrusion 32*a* may prevent the coupler 32 from being separated from the connector 200. For example, the coupler 32 and the connector 200 may be connected such that the locking protrusion 32*a* may be positioned between the stoppers 221. For this reason, when the coupler 32 is to rotate, the locking protrusion 32*a* may be engaged by the stoppers 221, so that the coupler 32 can rotate together with the connector 200.

Figure 8:
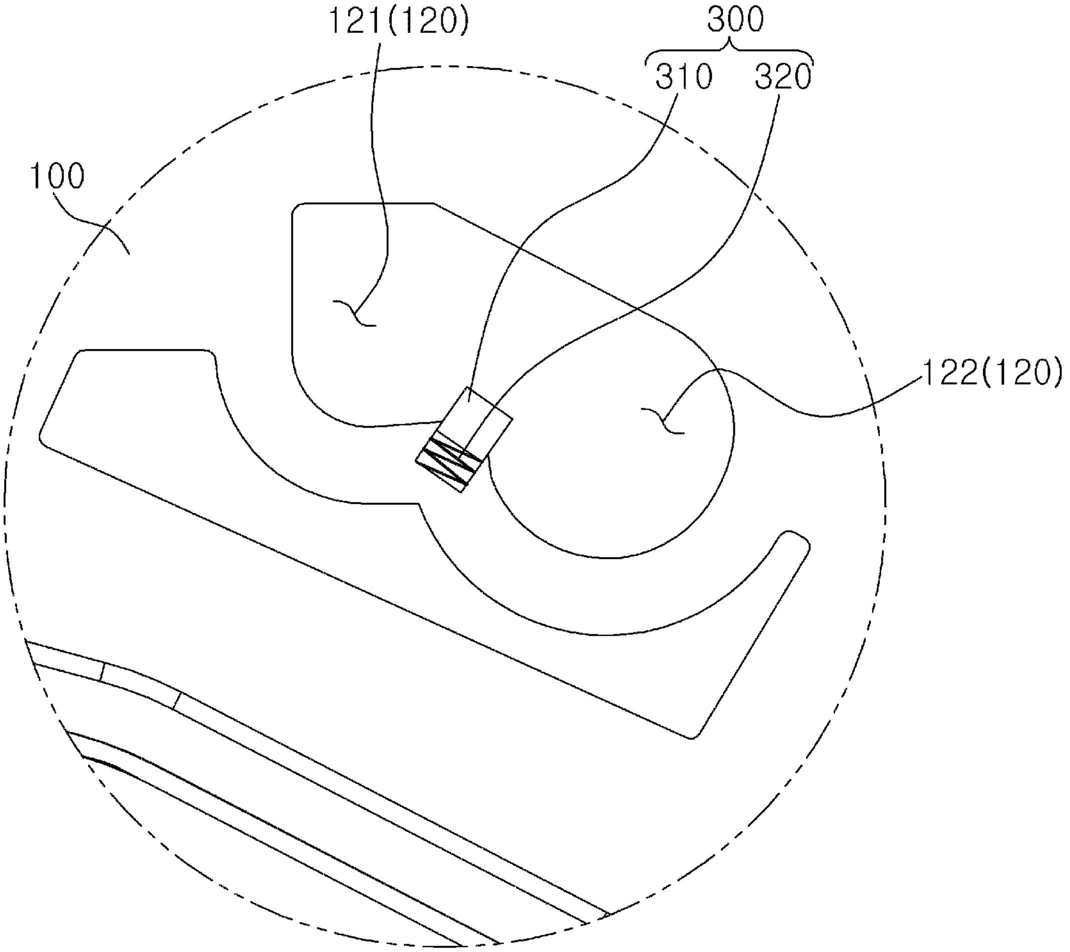
FIG. 8 is a view showing a position maintaining portion according to an example.

FIG. 8 is a view showing a position maintaining portion according to an example.

Referring to FIG. 8, the connector 200 may press the maintaining protrusion 310 so that the maintaining protrusion 310 is inserted into the frame 100 when the connector 200 is moved between the tilting position and the driving position.

The position maintaining portion 300 may include the maintaining protrusion 310 and an elastic support 320. The maintaining protrusion 310 may prevent the connector 200 located at the tilting position from moving to the driving position. The maintaining protrusion 310 may be supported by the elastic support 320 so as to elastically protrude into the through-hole 120. In addition, the maintaining protrusion 310 may be pressed by the connector 200 when the connector 200 is moved between the tilting position and the driving position. In this case, the maintaining protrusion 310 may be inserted into the frame 100.

The elastic support 320 may provide a restoring force to the maintaining protrusion 310. In addition, the elastic support 320 may be supported by the frame 100 to elastically support the maintaining protrusion 310. In an example, the elastic support 320 may elastically support the maintaining protrusion 310 so that the maintaining protrusion 310 elastically protrudes into the through-hole. For example, the elastic support 320 may be a coil spring.

Figure 9:
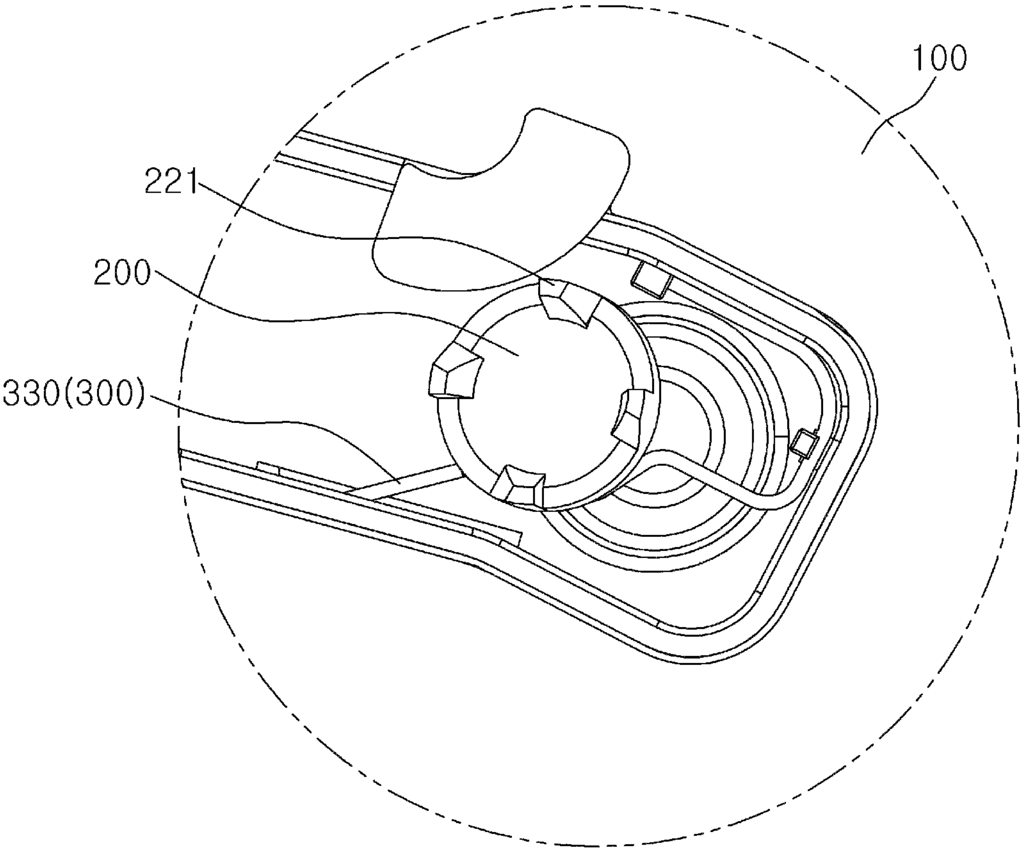
FIG. 9 is a view showing a connector and a position maintaining portion according to an example.
Figure 10:
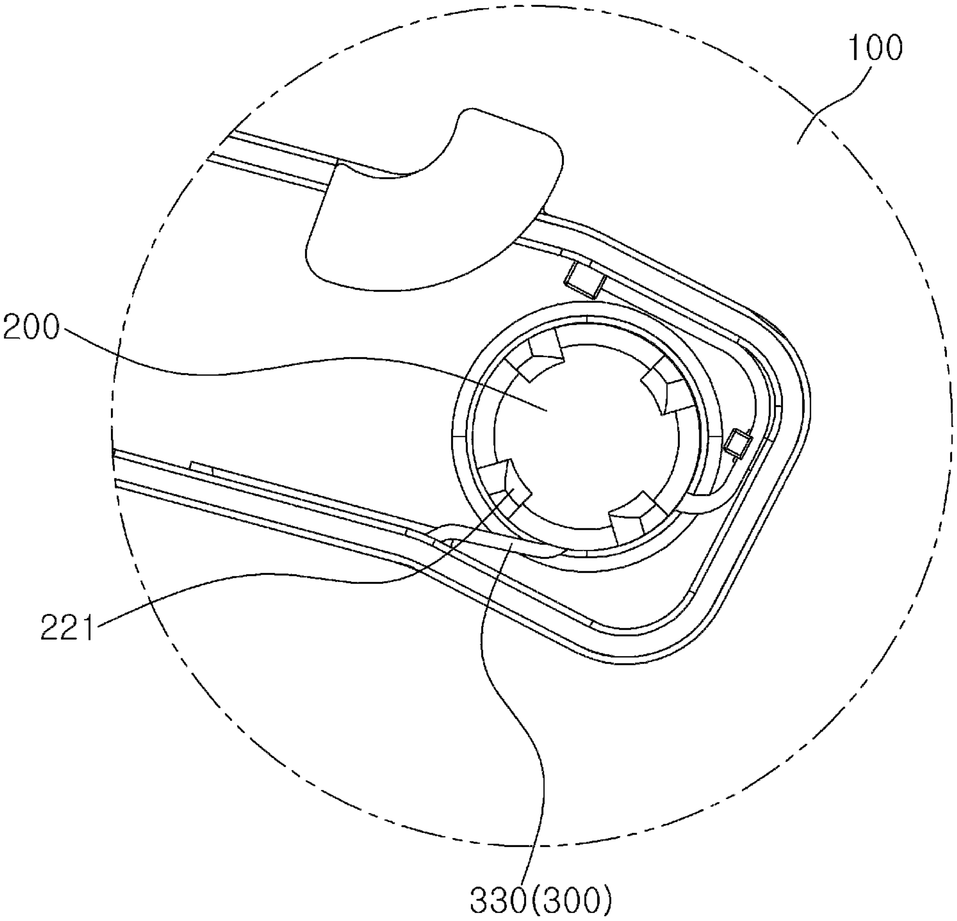
FIG. 10 is a view showing a state in which the connector shown in FIG. 9 is located at a driving position according to an example.

FIG. 9 is a view showing a connector and a position maintaining portion according to an example. FIG. 10 is a view showing a state in which the connector shown in FIG. 9 is located at a driving position according to an example.

Referring to FIGS. 9 and 10, arbitrary movement of the connector 200 between the tilting position and the driving position may be reduced or prevented by an elastic member 330. In an example, the elastic member 330 may provide a restoring force to the connector 200 so that the connector 200 is located at the tilting position when the connector 200 does not make contact with the coupler 32. For example, the elastic member 330 may be a spring, one side of which may be supported by the frame 100 and the other side of which may support the connector 200. The elastic member 330 may be pressed from the guide inlet 111 toward the coupling portion 112 by the pressing release portion 33. In addition, when the elastic member 330 is pressed by the pressing release portion 33, the restoring force applied to the connector 200 by the elastic member 330 is reduced.

In an example, the connector 200 may make contact with the coupler 32 as the pressing release portion 33 presses the elastic member 330, or may make contact with the coupler 32 before the pressing release portion 33 presses the elastic member 330, Therefore, since the restoring force is applied to the connector 200 by the elastic member 330 before the connector 200 makes contact with the coupler 32, the tilting position of the connector 200 can be maintained. In addition, when the connector 200 is located at the driving position, the elastic member 330 may be pressed by the pressing release portion 33 and kept out of contact with the connector 200.

In various examples, the connector 200 may be tilted with respect to the frame 100. In addition, the connector 200 has flexibility. Accordingly, an example structure of the toner cartridge 30 is simplified while efficiently transmitting power of the toner cartridge support 20 to the toner cartridge 30. In addition, by simplifying the structure of the toner cartridge 30, it is possible to simplify a manufacturing process and to reduce a manufacturing cost.

Furthermore, the connector 200 may be easily connected to or separated from the coupler 32 by moving between the tilting position and the driving position. In addition, the connector 200 located at the driving position can effectively transmit rotational power to the coupler 32 by avoiding contact with the position maintaining portion 300.

Moreover, the position maintaining portion 300 may prevent the connector 200 located at the tilting position from arbitrarily moving to the driving position, so that as the connector 200 and the coupler 32 make contact with each other, they can be connected at a certain angle and position. For this reason, as the toner cartridge 30 is installed in the toner cartridge support 20, the connector 200 and the coupler 32 are easily engaged with each other.

While examples of the present disclosure have been described, the disclosure is not limited thereto. Rather, it is apparent that various changes or modifications can be made that fall within the scope of the present disclosure without departing from the gist of the disclosure as claimed by the appended claims, and that such modifications are within the scope of the descriptions of the claims.

What is claimed is:

1. A toner cartridge connection structure, the structure comprising:
- a connector to be located at a driving position to contact a coupler, or a tilting position to be tilted with respect to the driving position; and
- a position maintaining portion to maintain the connector at the tilting position when the connector is separate from the coupler, wherein the connector located at the tilting position is tilted toward a direction opposite to a direction in which the coupler moves when making contact with the connector, wherein the position maintaining portion includes an elastic member to provide a restoring force to the connector to locate the connector at the tilting position when the connector is separate from the coupler, and wherein the elastic member is separate from the connector when the connector is located at the driving position.

2. The structure of claim 1, comprising:
- a frame including a coupling portion at which the connector is located, and
- wherein the connector located at the tilting position is tilted in a direction in which the coupler moves when a cartridge is mounted.

3. The structure of claim 2, comprising:
- a driving wheel to transmit power to the connector,
- wherein the connector, the coupler, and the driving wheel are coaxial when the connector is located at the driving position.

4. The structure of claim 3, wherein the connector includes a locking protrusion, the driving wheel includes an engaging groove to engage with the locking protrusion, the connector is to rotate in response to rotation of the driving wheel while the locking protrusion is engaged with the engaging groove, and the connector is to engage with the driving wheel for the connector to be tilted to the tilting position at any rotational phase of the driving wheel.

5. A toner cartridge connection structure, the structure comprising:
- a connector to be located at a driving position to contact a coupler, or a tilting position to be tilted with respect to the driving position;
- a position maintaining portion to maintain the connector at the tilting position when the connector is separate from the coupler,
- wherein the connector located at the tilting position is tilted toward a direction opposite to a direction in which the coupler moves when making contact with the connector; and
- a frame,
- wherein the position maintaining portion includes a maintaining protrusion to prevent the connector from moving between the tilting position and the driving position, wherein the position maintaining portion includes an elastic support to provide a restoring force to the maintaining protrusion and supported by the frame, the maintaining protrusion is supported by the elastic support so as to elastically protrude into a through-hole, and the connector is to press the maintaining protrusion for the maintaining protrusion to be inserted into the frame when the connector moves between the tilting position and the driving position.

6. The structure of claim 5, wherein the connector is to make contact with the maintaining protrusion when located at the tilting position, and is separate from the maintaining protrusion and the frame when located at the driving position.

7. The structure of claim 5, wherein the maintaining protrusion has elasticity, and is to be deformed by the connector when the connector moves.

8. The structure of claim 5, wherein the frame includes a through-hole into which the connector is inserted and wherein the maintaining protrusion protrudes into the through-hole, the through-hole includes a first region and a second region, the connector is to penetrate the first region when located at the tilting position and penetrate the second region when located at the driving position, and the maintaining protrusion is located between the first region and the second region to prevent the connector from moving between the tilting position and the driving position.

9. An image forming apparatus, comprising:
- a toner cartridge support to support a toner cartridge having a coupler,
- wherein the toner cartridge support includes:
- a connector to be located at a driving position to contact the coupler when the toner cartridge is located at an operable position, or a tilting position to be tilted with respect to the driving position;

a position maintaining portion to maintain the connector at the tilting position when the connector is separate from the coupler, wherein a restoring force to the connector is reduced when the connector is located at the driving position;

wherein the connector located at the tilting position is tilted toward a direction opposite to a direction in which the coupler moves when making contact with the connector; and a frame including a guide to guide a movement of the toner cartridge, wherein the guide includes a guide inlet through which the toner cartridge is to enter and exit the guide, and a coupling portion at which the connector is located, and wherein the connector located at the tilting position is tilted in a direction in which the guide extends from the coupling portion toward the guide inlet.

10. The apparatus of claim 9, wherein the position maintaining portion includes an elastic member to provide a restoring force to the connector to locate the connector at the tilting position when the connector is separate from the coupler.

11. The apparatus of claim 10, wherein the elastic member is to be pressed in a direction toward the coupling portion.

12. The apparatus of claim 11, wherein the connector is to make contact with the coupler at or before a time at which the elastic member is pressed.

13. A cartridge detachably mountable to an image forming apparatus having a connector, a guide inlet, and an elastic spring member, the cartridge comprising:

a coupler to contact the connector located at a driving position and to separate from the connector located at a tilting position at which the connector is tilted with respect to the driving position;

wherein when making contact with the connector, the coupler is to move in a direction opposite to a direction in which the connector located at the tilting position is tilted; and a pressing release portion to press the elastic spring member from a guide inlet toward the connector.

14. The cartridge of claim 13, wherein the coupler is separate from the connector when an elastic member of the image forming apparatus provides a restoring force to the connector to locate the connecter at the tilting position.

15. The cartridge of claim 14, wherein the coupler is to make contact with the connector at or before a time at which the pressing release portion presses the elastic member.

16. The cartridge of claim 13, wherein the coupler and the connector are coaxial when the coupler contacts the connector located at the driving position.

* * * * *